United States Patent [19]

Meltser et al.

[11] Patent Number: 5,763,113
[45] Date of Patent: Jun. 9, 1998

[54] PEM FUEL CELL MONITORING SYSTEM

[75] Inventors: Mark Alexander Meltser, Pittsford; Stephen Andreas Grot, West Henrietta, both of N.Y.

[73] Assignee: General Motors Corporation, Detroit, Mich.

[21] Appl. No.: 702,895

[22] Filed: Aug. 26, 1996

[51] Int. Cl.$^6$ .................................................. H01M 8/04
[52] U.S. Cl. ........................... 429/13; 429/22; 429/23
[58] Field of Search ............................ 429/12, 13, 22, 429/23, 30, 33; 204/431

[56] References Cited

U.S. PATENT DOCUMENTS

| | | | |
|---|---|---|---|
| 5,429,885 | 7/1995 | Stockburger et al. | 429/13 |
| 5,462,815 | 10/1995 | Horiuchi | 429/13 |
| 5,472,580 | 12/1995 | Kennard et al. | 60/277 X |
| 5,478,662 | 12/1995 | Strasser | 429/13 |

*Primary Examiner*—Anthony Skapars
*Attorney, Agent, or Firm*—Lawrence B. Plant

[57] ABSTRACT

Method and apparatus for monitoring the performance of $H_2$—$O_2$ PEM fuel cells. Outputs from a cell/stack voltage monitor and a cathode exhaust gas $H_2$ sensor are corrected for stack operating conditions, and then compared to predetermined levels of acceptability. If certain unacceptable conditions coexist, an operator is alerted and/or corrective measures are automatically undertaken.

2 Claims, 2 Drawing Sheets

PEM FUEL CELL MONITORING SYSTEM

The Government of the United States of America has rights in this invention pursuant to contract No. DE-AC02-90CH10435 awarded by the United States Department of Energy.

TECHNICAL FIELD

This invention relates to method and apparatus for monitoring PEM fuel cell stacks, alerting the operator to stack degrading conditions, and/or automatically initiating corrective measures to counter such conditions.

BACKGROUND OF THE INVENTION

Fuel cells have been proposed as a power source for many applications. So-called PEM (i.e., Proton Exchange Membrane) fuel cells [a.k.a. SPE (Solid Polymer Electrolyte) fuel cells] potentially have high energy and low weight, and accordingly are desirable for mobile applications (e.g., electric vehicles). PEM/SPE fuel cells are well known in the art, and include a "membrane-electrode-assembly" comprising a thin, proton-transmissive, solid polymer membrane-electrolyte having an anode on one of its faces and a cathode on the opposite face. The membrane-electrode-assembly is sandwiched between a pair of electrically conductive elements which serve as current collectors for the anode and cathode, and contain appropriate channels and/or openings therein for distributing the fuel cell's gaseous reactants over the surfaces of the respective anode and cathode catalysts. The channels/openings for the reactants are often referred to as "flow channels." A plurality of individual fuel cells are commonly bundled together to form a PEM fuel cell stack.

PEM fuel cells are typically $H_2$—$O_2$ fuel cells wherein hydrogen is the anode reactant (i.e., fuel) and oxygen is the cathode oxidant. The oxygen can either be in pure form (i.e., $O_2$), or air (i.e., $O_2$ admixed with $N_2$). The solid polymer membranes are typically made from ion exchange resins such as perflourinated sulfonic acid. One such resin is NAFION® sold by E.I. DuPont deNemours & Co. Such membranes are well known in the art and are described in U.S. Pat. Nos. 5,272,017 and 3,134,697, and in Journal of Power Sources, Volume 29 (1990) pages 367–387, inter alia. The anode and cathode themselves typically comprise finely divided carbon particles, very finely divided catalytic particles supported on the internal and external surfaces of the carbon particles, and proton conductive resin intermingled with the catalytic and carbon particles. One such membrane-electrode-assembly and fuel cell is described in U.S. Pat. No. 5,272,017 issued Dec. 21, 1993 and assigned to the assignee of the present invention.

PEM fuel cell performance can degrade for a number of reasons including carbon monoxide poisoning of the anode catalyst, flooding of the cells with $H_2O$, and untoward nonuseful leakage of gaseous hydrogen around or through the proton exchange membrane. In this later regard, $H_2$ invasion of the cathode gas stream can occur by essentially three mechanisms to wit (1) leaky seals, (2) damage (e.g., puncture or tearing) to the membrane, and (3) naturally occurring bleeding/seepage through pin holes/pores in the membrane. Transport of gaseous hydrogen ($H_2$) to the cathode side of the membrane can result in nonuseful $H_2$ consumption, loss of cell/stack efficiencies and a drop in cell voltage. CO poisoning and/or $H_2O$ flooding result in a drop in cell and stack voltage and performance. When any of these situations are indicated, corrective action is warranted to prevent irreversible cell/stack degradation.

SUMMARY OF THE INVENTION

The present invention contemplates method and apparatus for monitoring the performance of a stack of PEM fuel cells, and automatically triggering corrective measures (e.g., alert operator and/or initiate preventative action) when the performance degrades to an unacceptable level, as for example, may occur incident to CO poisoning of the anode catalyst, water flooding of one or more the cells and/or excessive hydrogen invasion of the cathode gas. More specifically, the present invention contemplates (1) measuring (i) hydrogen concentration in the cathode exhaust gas, (ii) individual cell voltages, and (iii) overall stack voltage, and (2) comparing the measured values to predetermined reference values of acceptability to indicate the condition of a PEM fuel cell stack.

The stack comprises a plurality of individual cells. Each cell comprises (1) a proton exchange membrane (e.g., NAFION®) having an anode and a cathode affixed to opposing first and second surfaces of the membrane, (2) a first flow channel adjacent the anode for passing hydrogen into contact with the anode, and (3) a second flow channel adjacent the cathode for flowing an oxygen-bearing gas (preferably air) into contact with the cathode. A stack of such cells includes an exhaust gas manifold for receiving cathode exhaust gas from the several second flow channels. An hydrogen sensor communicates with the exhaust manifold for measuring the hydrogen concentration in the exhaust gas, and outputs a voltage which is proportional to the log of the ratio of the $H_2$ to the $O_2$ concentration times the mass flow rate of the gas. A cell/stack monitor measures total stack voltage as well as individual cell voltages. A number of measurements, calculations, and comparisons to predetermined reference values are made to determine the condition of the stack, and, based thereon, corrective measures are taken such as alerting the stack's operator of impending or prospective undesirable condition(s), and/or automatically initiating preventative actions to mitigate such condition(s).

One embodiment of the invention focuses primarily on detecting untoward transfer of $H_2$ into the cathode exhaust. To this end: (1) the flow rate of the cathode exhaust gas is determined (e.g., calculated or measured); (2) the concentration of hydrogen in the exhaust gas is measured (e.g., by the $H_2$ sensor); (3) the output from the $H_2$ sensor, which is indicative of the hydrogen concentration in the exhaust gas, is corrected to make allowances for hydrogen content which is attributable to variations in exhaust gas flow rate; (4) from the corrected hydrogen content, the rate of change in hydrogen concentration with respect to time (i.e., $dH_2/dt$) is calculated; (5) the $dH_2/dt$ is compared to a first predetermined value which is the maximum acceptable rate of hydrogen concentration increase in the exhaust gas; (6) if the calculated $dH_2/dt$ is equal to or exceeds the first predetermined value, a first signal is outputted; (7) the corrected hydrogen concentration is then compared to a second predetermined value which is the maximum acceptable total hydrogen concentration in the exhaust gas; (8) if the corrected hydrogen concentration is equal to or exceeds the second predetermined value, a second signal is outputted; (9) the total voltage ($V_s$) across the stack of cells is measured; (10) the rate of decrease in stack voltage (if any) with respect to time ($dV_s/dt$) is calculated; (11) the power demand on the stack is read; (12) the rate of stack voltage decrease ($dV_s/dt$) is corrected to make allowances for voltage changes attributable to the power demand on the stack; (13) the corrected rate of stack voltage decrease is compared to a third predetermined value corresponding to the maximum acceptable rate of decrease in stack voltage which has been corrected for power demand; (14) if the corrected rate of stack voltage decrease is equal to or greater than the third predetermined value, a third signal is outputted; and (15) if the conditions producing the first, second and third signals coexist, the system automatically initiates corrective measures to reduce the hydrogen concentration in the exhaust gas to an acceptable level. Such measures may include triggering visual or audible alerts to the stack operator to take appropriate action, or automatically initiating preventative measures such as (a) reducing $H_2$ pressure, (b) increasing cathode gas flow rate or pressure, or (c) starting a preprogrammed stack shutdown sequence.

According to a preferred embodiment of the invention, certain telltales, or advance indicators, of the stack's prospective condition will also be provided which can automatically trigger appropriate actions to mitigate such conditions before they become serious. To this end: (a) the corrected hydrogen concentration determined from step 3 above is compared to a fourth predetermined value which is the maximum acceptable hydrogen concentration in the exhaust gas attributable to natural seepage of hydrogen gas through the membrane; (b) if the corrected hydrogen concentration exceeds this fourth predetermined value, a fourth signal is outputted; (c) if the corrected hydrogen concentration from step 3 above is less than the second predetermined value above, a fifth signal is outputted; (d) a first individual cell voltage ($V_1$) of a first of the cells in the stack is measured and memorized; (e) a second individual cell voltage ($V_2$) of a second of the cells in the stack is measured; (f) the first individual voltage ($V_1$) is subtracted from the second individual voltage ($V_2$) to determine any difference $\Delta V$ therebetween; (g) this difference $\Delta V$ is compared to a fifth predetermined value which is the maximum acceptable voltage difference between any two individual cells in the stack; (h) steps d–g above are repeated for each and every individual cell in the stack; (i) if the voltage difference $\Delta V$ between any two cells in the stack is less than or equal to the fifth predetermined value, a sixth signal is outputted; (j) if this voltage difference $\Delta V$ is greater than the fifth predetermined value, a seventh signal is outputted; (k) when the conditions producing the fourth, fifth and seventh signals coexist, the prospect of potential/future excessive hydrogen leakage is indicated so that corrective measures designed to mitigate this condition can be undertaken with ample time to correct the matter. When the conditions producing the third, fifth and sixth signals coexist, the prospect of some other potential/future performance—eroding condition, (e.g., carbon monoxide poisoning) is indicated so that corrective measures designed to mitigate such condition can be undertaken. Such measures might include (1) simply alerting the operator or (2) triggering the automatic shutdown of the stack during its next idle period to purge the anode with $O_2$/air to remove the CO, or purge the cathode with excess air to remove any $H_2O$ accumulated therein.

BRIEF DESCRIPTION OF THE DRAWINGS

The invention will be better understood when considered in the light of the following detailed description thereof which is given hereafter in conjunction with the following drawings of which.

DESCRIPTION OF THE PREFERRED EMBODIMENT

Figure 1:
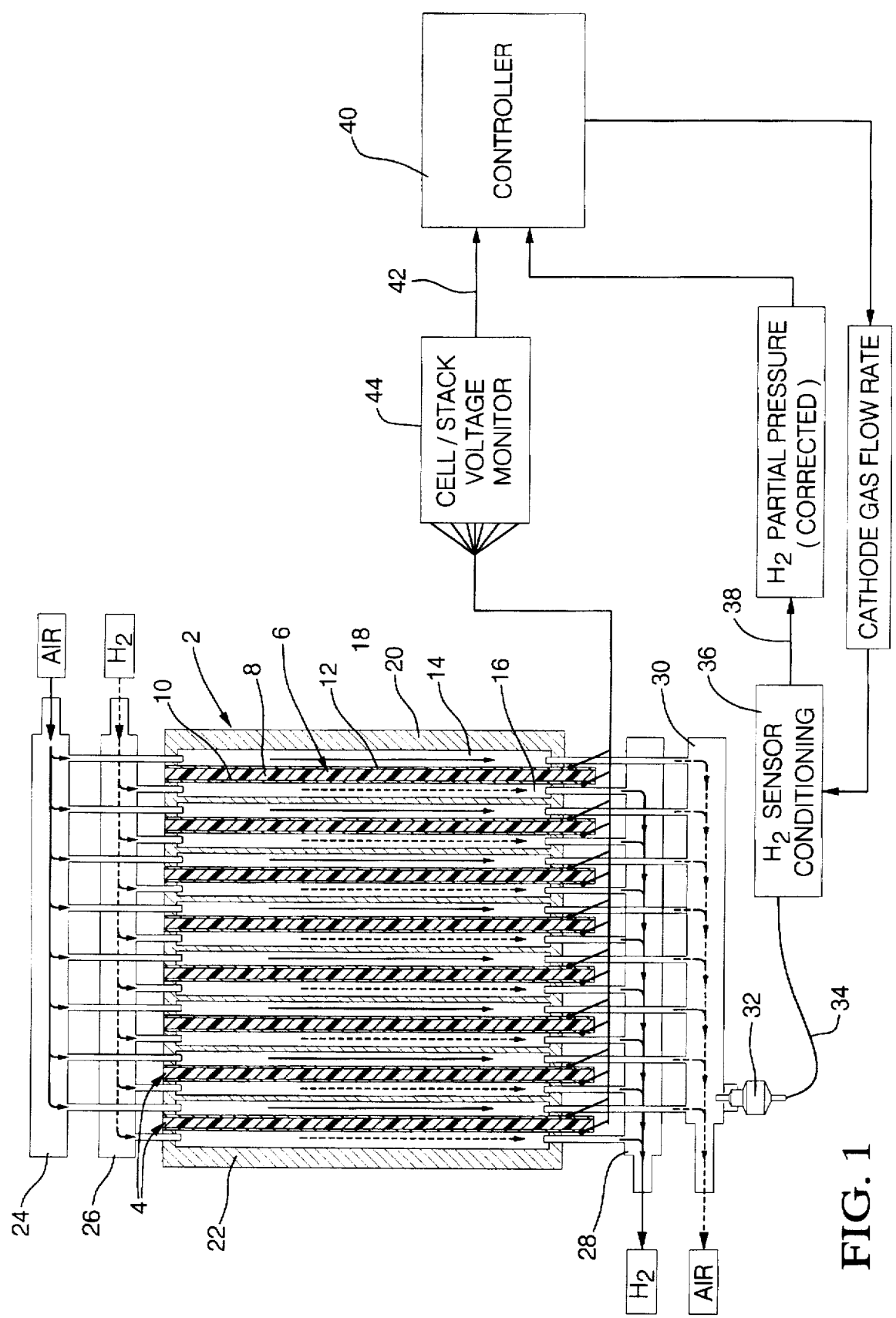
FIG. 1 is a schematic of a bipolar, PEM fuel cell stack, and monitoring system therefor.

FIG. 1 depicts a stack 2 of individual fuel cells 4 each comprising a membrane electrode assembly 6 having a proton conductive resin membrane 8 with an anode 10 on one surface thereof and a cathode 12 on the opposite surface thereof. A cathode flow channel 14 is provided adjacent the cathode 12 for flowing an oxygen-rich gas (i.e., preferably air) by and into contact with the cathode 12. Similarly an anode flow channel 16 is provided adjacent the anode 10 for flowing hydrogen fuel by and into contact with the anode 10. The membrane 8 will preferably comprise a perfluorinated sulfonic acid polymer such as NAFION® as is well known in the PEM fuel cell art. Each individual cell is separated from the next in the stack by a bipolar plate 18, which is a conductive plate (e.g., metal, carbon, etc.) which separates the several cells one from the next yet permits electrical current to flow directly from one cell to the next in an electrical series connection of the several cells in the stack 2. The bipolar plates 8 will have a plurality of ribs or bosses (not shown) thereon for engaging the anode 10 and cathode 12 and collecting current therefrom. The ribs/bosses define a plurality of grooves or the like (not shown) through which the $H_2$ and $O_2$ flow. End plates 20 and 22 terminate the stack and define the respective cathode and anode flow channels for the end cells of the stack. A cathode gas supply manifold 24 distributes the cathode gas (e.g., air) to the several cathode flow channels 14. Similarly an anode inlet manifold 26 distributes hydrogen fuel to the several anode flow channels 16. A hydrogen exhaust manifold 28 collects unused hydrogen from the several anode flow channels and recirculates it back to the inlet manifold 26 for reuse. Similarly, a cathode exhaust gas manifold 30 collects exhaust gas from the cathode flow channels 16.

The cathode exhaust gas comprises nitrogen, unconsumed oxygen, water, and a small amount of hydrogen which seeps or bleeds naturally through the membrane 8 as a result of micropores or pin holes left therein as a normal result of the process used to manufacture the membrane. Hence, a certain amount of hydrogen seepage through the membrane is to be expected and can be tolerated. $H_2$ seepage/bleeding rates of about 0.03 std. cc/min/$cm^2$ of a membrane which is 2 mils thick is not unusual for cells having a pressure difference across the membrane of 300 kPa. Untoward leakage of hydrogen through the membrane into the cathode flow channel, however, is impermissible as it substantially reduces the operating efficiency of the stack, nonusefully consumes hydrogen, and can cause a drop in cell/stack voltage. Untoward invasion of the cathode flow channel by gaseous hydrogen could result from a tear or rupture of the membrane or by simply an enlarging of any of the pre-existing pores/pin holes in the membrane over time. Similarly, leakage around seals in the fuel stack could also cause untoward transfer of gaseous hydrogen into the cathode stream. In either case, it is desirable to monitor the stack to quantify the $H_2$ leakage, and to automatically trigger corrective action if it becomes untoward. Such corrective action may involve simply alerting the operator to take appropriate action, or automatically triggering appropriate action (e.g., stack shutdown).

As part of the hydrogen leakage alert system, a hydrogen sensor 32 communicates with the cathode exhaust gas manifold 30 for measuring the hydrogen concentration therein. The $H_2$ sensor 32 may be any rapid response hydrogen sensor such as the sensor disclosed in U.S. Pat. No. Kennard et al 5,472,580 issued Dec. 5, 1995 and assigned to the assignee of the present invention. A voltage output signal 34 from the hydrogen sensor 32 is conditioned or adjusted by correcting it to make allowances for acceptable hydrogen concentration variations in the cathode exhaust attributable to variations in the cathode gas flow rate as will be discussed in more detail hereinafter. A corrected signal 38 is sent to a system controller 40 along with output 42 from a cell/stack voltage monitor 44. The cell/stack voltage monitor 44 is essentially a combined scanner and digital voltmeter that scans the stack 2, one cell at a time, reading the voltage of each individual cell as well as the total voltage of the stack. A preferred such monitor is a so-called Battery Pack Monitor (BPM) sold by the Delco Electronics Corporation to monitor battery packs, and individual battery modules therein, in electric vehicles. Such monitors 44 essentially take the form of a conventional general purpose digital computer based controller programmed to monitor individual cells or group of cells voltage, as well as total stack output voltage and current. Accordingly, the monitor 44 includes a common digital computer with associated read-only memory (ROM), read-write random access memory (RAM), electrically programmable read only memory (EPROM), and input/output sections which interface with the cells in the stack, and system controller 40. The read-only memory of the digital computer of the monitor's controller contains the instructions necessary to implement the basic input/output instructions. The electrically programmable read only memory (EPROM) contains the instructions necessary to implement the monitors own internal control, data manipulation, and communication algorithms. The cell/stack voltage monitor 44 communications with the main electronic controller 40 though the means of any appropriate communication network protocol, many of which are known in the art. A specific program for carrying out the functions of the cell/stack voltage monitor 44 may be accomplished by standard skill in the art using conventional information processing languages.

The electronic controller 40 takes the form of a conventional general purpose digital computer based controller programmed (1) to control the operating parameters of the fuel cell stack system to the power demands placed on the system, and (2) to diagnose the condition of the stack according to the present invention. Accordingly, the controller 40 includes a common digital computer with associated read-only memory (ROM), read-write random access memory (RAM), electrically programmable read only memory (EPROM), electrically programmable "flash" memory, a central processing unit (CPU), and input/output sections which interface with cell/stack voltage monitor, hydrogen and other sensors and various actuators. A preferred such controller 40 is an EDCX-3 microcontroller from the Delco Electronics Corporation. The read-only memory of the digital computer of the controller 40 contains the instructions necessary to implement the basic input/output instructions. The electrically programmable "flash" memory contains the instructions necessary to implement the control algorithms set forth in FIG. 2. The electrically programmable read only memory (EPROM) contains the calibration constants against which the various cell/stack operating parameters are compared. A specific program for carrying out the functions depicted in the flow diagram of FIG. 2 may be accomplished by standard skill in the art using conventional information processing languages.

Figure 2:
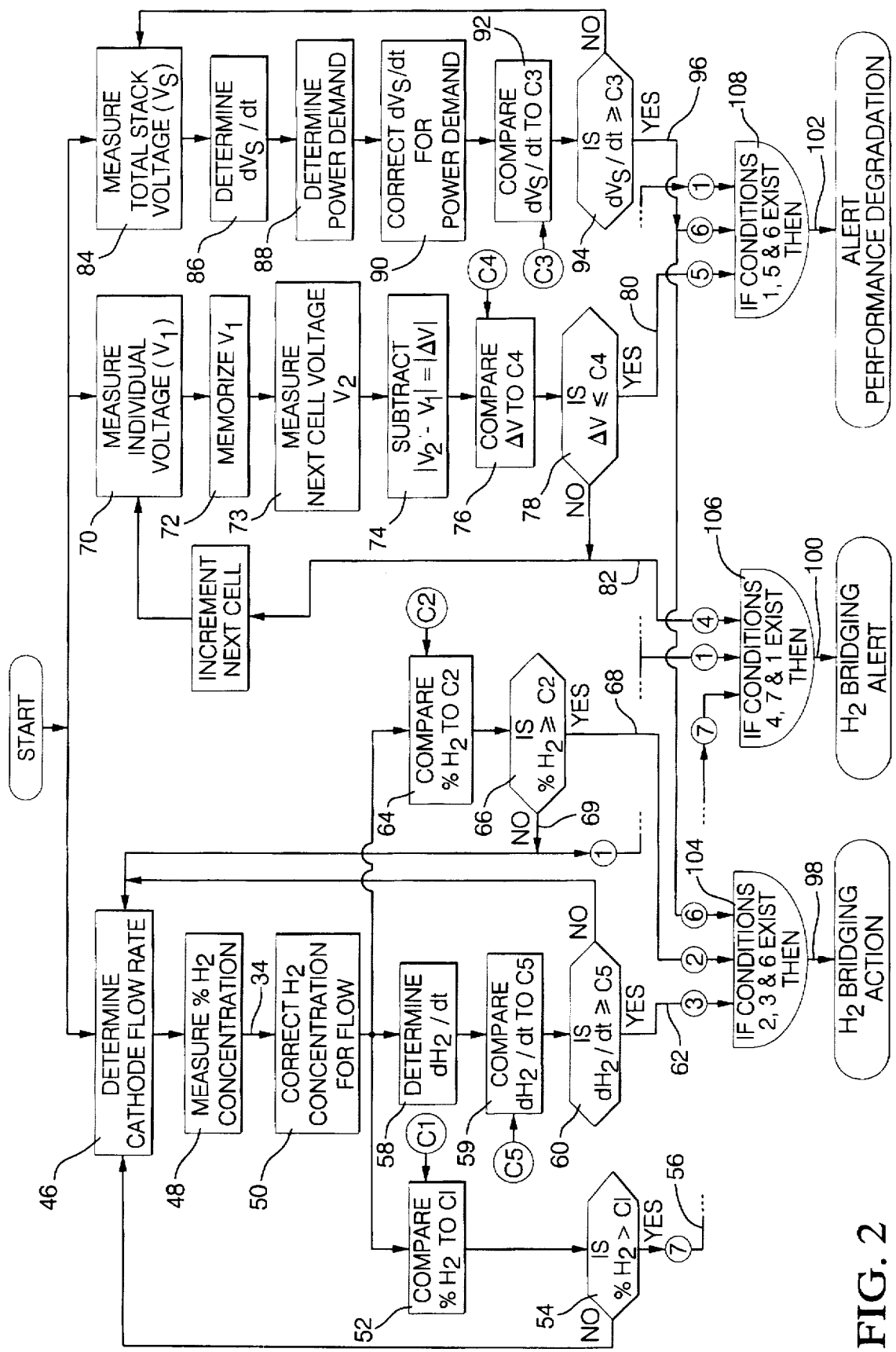
FIG. 2 is a logic diagram illustrating the process of the present invention used to monitor the stack's operation and initiate appropriate corrective measures if needed.

The controller 40 is programmed to perform the process depicted in FIG. 2, which is a logic diagram of the process of the present invention. The controller 40 electronically repeats the process over and over in intervals of about 100 milliseconds. That is to say, about every 100 milliseconds all of the steps shown in FIG. 2, and described hereinafter, are repeated.

In order to achieve maximum overall system (i.e., fuel cell stack and peripherals, such as compressors, reformers, heat exchangers, etc.) efficiency, the flow rate of the inlet air will vary depending upon the power demand on the stack. The flow rate of the cathode gas in the exhaust manifold 30 is determined in step 46 by first measuring the mass flow rate (grams/second) of the air in the intake manifold 24 and then, based on the power demand on the stack (and corresponding reaction rate in the cells), calculating the mass flow rate of the cathode exhaust gas in the exhaust manifold 30. This exhaust gas will have less $O_2$ than the inlet air, but will have more water as well as some $H_2$ picked up in the several cells 4. The mass flow rate is measured in the intake manifold rather than the exhaust manifold because the composition of the gas (i.e., air) therein is a constant (i.e., 79% $N_2$ and 21% $O_2$). Any commercially available calorimetric mass flow rate meter can be used for this purpose. The mass flow rate of the exhaust gas is determined from the mass flow rate of the cathode inlet gas by means of a first lookup table the values of which are determined imperically wherein, through a series of experiments, the mass flow rate of the exhaust gas is determined as the mass flow rate of the inlet cathode gas changes as a function of the power demand placed on the stack. The correction made to the signal 34 is made by means of a second lookup table which is based on imperical data which takes into account the $H_2$ concentration changes due to mass flow rate changes in the system, and specifically sets forth the actual concentration of hydrogen, irrespective of the dilution effect, as a function of the actual exhaust gas mass flow rate as determined from the first lookup table. At step 48 the hydrogen concentration in the exhaust manifold 30 is measured by the sensor 32, and the output signal 34 therefrom corrected at step 50 for hydrogen concentration variations due to cathode gas flow rate variations. In this regard, increased air flow rates could mask or hide an excessive hydrogen leakage condition, since the extra oxygen reacts with more of the gaseous hydrogen which in turn, reduces the amount of hydrogen in the exhaust gas. In effect, the hydrogen is diluted which leads to an artificially low concentration of $H_2$ being sensed and reported even though $H_2$ leakage is excessive. Accordingly, the signal 34 is corrected to make allowances for this dilution effect. Acceptable levels of hydrogen in the cathode exhaust gas will preferably be something less than about 2% by volume.

In step 52, the corrected hydrogen concentration is compared to a calibration constant, C1, which is the maximum acceptable hydrogen concentration in the exhaust gas that is attributable to allowable seepage/bleeding of hydrogen gas through the membrane. The constant, C1, is determined imperically by measuring the normal amount of $H_2$ seepage/bleeding through membranes having different numbers and sizes of pin holes therein. C1 will depend on the composition, thickness and area of the membrane. Hence the constant, C1, will vary from one stack to the next. By way of example, the constant, C1, will be 20 parts per million of $H_2$ in the exhaust gas (as corrected) for 2 mil thick NAFION® 112 membranes having an electrode area of 500 cm². As shown in box 54, an output signal 56 is generated when the corrected hydrogen concentration in the exhaust gas exceeds C1 and indicates that a high hydrogen concentration condition (7) exists. The "no" path exiting step 54, and the several other steps, merely indicates that the preceding sequence of steps is repeated.

$H_2$ concentration alone is not solely determinative that some sort of corrective action is warranted. Hence, it is also desirable to determine the rate at which the hydrogen concentration in the exhaust gas changes (i.e., $dH_2/dt$), and particularly whether or not there is a rapid increase in that concentration which is indicative of a membrane or a seal failure. Accordingly at step 58, the controller 40 also determines the rate of hydrogen concentration change, and at step 59 compares it to a calibration constant, C5. In this regard, the controller 40 determines the difference between two consecutive $H_2$ concentration readings and divides it by the time interval between such readings. The constant, C5, is a subjective constant determined by the fuel cell designer based on his/her perception of the response/reaction time needed for taking corrective action to prevent significant performance decay or irreversible cell/stack degradation. Hydrogen concentration decreases are of no concern. On the other hand, rapid increases in hydrogen concentration in the exhaust gas warrants initiating corrective action to reduce this condition. By way of example, C5 might be set at about 20%–25% below the rate of change of hydrogen in the exhaust gas that is attributable to the unset of untoward leakage of hydrogen through the membrane. As indicated in block 60, if the hydrogen concentration rate of change is equal to or greater than the value C5, an output signal 62 is provided indicating the existence of a condition (3).

The corrected hydrogen concentration is also compared to a calibration constant, C2, which is the maximum acceptable total hydrogen content allowable in the exhaust gas. This value C2 will be set by the stack designer, and will preferably be no more than about 2% by volume. As indicated in block 66, if the hydrogen concentration in the exhaust gas is equal to or exceeds the constant, C2, an output signal 68 is provided which indicates that a condition (2) exists. On the other hand, if the hydrogen concentration is less than C2, an output 69 is generated which indicates that a condition (1) exists.

The cell/stack voltage monitor 44 scans the entire stack 2 of cells 4 measuring the individual voltage (e.g., $V_1$, $V_2$, etc.) for each and every individual cell in the stack, as well as the entire stack. These voltages are provided to the controller 40 which determines if any significant voltage difference exists between any two cells in the stack. If so, an appropriate signal 82 is provided. In this regard, at step 70 the voltage $V_1$ across a single cell 4 in the stack 2 is measured. The voltage ($V_1$) is memorized at step 72, and the voltage in another (preferably adjacent) cell in the stack is measured at step 73. The difference, $\Delta V$, between the first measured voltage $V_1$ and the second measured voltage $V_2$ is then determined at step 74, and at step 76 such difference compared to a calibration constant, C4, which is the maximum acceptable voltage difference between any two cells in the stack. This acceptable/allowable voltage difference C4 is determined imperically and shows the normal voltage variations from one cell to the next in a healthy fuel cell stack, and is expected to be about no more than 100 millivolts between cells. The precise value of C4, at any point in time, will vary according to the polarization curve of the stack under various conditions of load, as is well known to artisans skilled in this field. What $\Delta V$ would be allowable at any given instant would be determined by a lookup table which is derived from the applicable polarization curve for the particular stack. If a membrane ruptures, the voltage will drop in the cell where the rupture occurs, and the $\Delta V$ for that cell with respect to another healthy cell will increase significantly. Only $\Delta V$s in the negative direction (i.e., voltage drop) are considered significant. Hence as shown in block 78, if the $\Delta V$ is less than or equal to C4, an output 80 is produced which indicates that a condition (5) exists. This is a "no problem" condition. On the other hand, if the $\Delta V$ is greater than C4 an output 82 is generated which indicates that an undesirable (i.e., high $\Delta V$) condition (4) exists.

Finally, the output voltage of the entire stack is measured and used as a factor in determining the condition of the stack. More specifically, as indicated at step 84, the cell/stack voltage monitor 44 measures total stack voltage $V_s$ and reports it to the system controller 40. Based thereon, the controller 40 determines the rate of change in voltage with respect to time as indicated at block 86. At step 88, the total power demand on the stack is determined by the cell/stack voltage monitor 44. At step 90, the voltage change rate ($dV_s/dt$) is then corrected for the power demand. In this regard, it is known that as the power demand or load on a stack increases, the stack voltage will decrease according to the power polarization curve for that stack. Accordingly, a lookup table is devised based on that polarization curve, and the appropriate voltage rate correction taken from that lookup table. The corrected $dV_s/dt$ is then compared at step 92 to a constant, C3, which is the maximum allowable rate of decrease in stack voltage for that particular stack. The constant, C3, is determined imperically from experiments based on stack voltage drop due to maximum allowable carbon monoxide levels in the hydrogen fuel (i.e., about 20 parts per million). As indicated in block 94, if the stack voltage change rate is equal to or exceeds the maximum allowable rate of decrease in stack voltage (i.e., C3) an output signal 96 is generated which is indicative of the existence of condition (6).

The controller 40 contains a number of subroutine programs which are triggered by different combinations of the conditions 1–7 mentioned above. For example if condition 2, 3 and 6 coexist, immediate corrective measures are warranted, and will automatically be undertaken to mitigate the high $H_2$ concentration condition. In this regard when an "and gate" 104 determines the coexistence of such conditions, it sends a signal 98 which may either alert the operator, or trigger a subroutine/program which automatically starts to correct the problem, e.g., by shutting down the stack, or throttling it back by opening/closing such valves, switches, etc. in the fuel cell system and peripheral equipment in a prescribed sequence as may be necessary to mitigate the high hydrogen concentration. Similarly if conditions 4, 7 and 1 coexist, an "and gate" 106 issues a signal 100 which will trigger a subroutine which may illuminate a warning light, sound an alarm or automatically undertake steps to reduce the effects of unacceptable hydrogen bridging of the membrane, e.g., via isolating the defective cell, throttling back on the hydrogen pressure, or increasing the cathode gas pressure, inter alia. Finally if conditions 1, 5 and 6 coexist, an "and gate" 108 issues a signal 102 which triggers a subroutine which may illuminate a warning light, sound an alarm, or automatically undertake appropriate corrective action to reduce the performance degradation of the stack. For example in the case of carbon monoxide poisoning, a subroutine may be initiated which cuts off hydrogen flow when the stack is idle, and flows air/$O_2$ into the anode flow channel to remove the carbon monoxide from the anode. Thereafter, the process is reversed and the stack put back on stream. $H_2O$ flooding, on the other hand, may be mitigated by flowing excess air through the cathode flow channel.

While the invention has been disclosed primarily in terms of specific embodiments thereof it is not intended to be limited thereto but rather only to the extent set forth hereafter in the claims which follow.

We claim:

1. A method for monitoring the performance of a stack of $H_2$—$O_2$ PEM fuel cells and alerting the stack's operator and/or triggering corrective action when said performance degrades to an unacceptable level, said stack having an exhaust gas manifold communicating with, and receiving a cathode exhaust gas from, each of said cells, comprising the steps of:

1. determining the flow rate of said exhaust gas in said manifold;

2. measuring the concentration of hydrogen in said exhaust gas;

3. correcting the hydrogen concentration measured in step 2 to make allowances for hydrogen concentrations in said exhaust gas attributable to variations in said flow rate;

4. from the corrected hydrogen concentration determined in step 3, determining the rate of change in hydrogen concentration in said exhaust gas with respect to time (i.e. $dH_2/dt$);

5. comparing the $dH_2/dt$ determined in step 4 to a first predetermined value which is the maximum acceptable rate of hydrogen increase in said exhaust gas;

6. outputting a first signal from step 5 when $dH_2/dt$ is equal to or exceeds said first predetermined value;

7. comparing the corrected hydrogen concentration from step 3 to a second predetermined value which is the maximum acceptable total hydrogen content in said exhaust gas;

8. outputting a second signal from step 7 when the corrected hydrogen concentration from step 3 is equal to or exceeds said second predetermined value;

9. measuring the total voltage ($V_s$) across said stack;

10. determining the rate of any decrease in stack voltage with respect to time ($dV_s/dt$);

11. reading the power demand on the stack;

12. correcting the rate of stack voltage decrease ($dV_s/dt$) determined in step 10 to make allowances for stack voltage changes attributable to said power demand;

13. comparing the rate of corrected stack voltage decrease from step 12 to a third predetermined value which is the maximum acceptable rate of decrease in corrected stack voltage;

14. outputting a third signal from step 13 when the corrected stack voltage decrease is equal to or greater than said third predetermined value; and 15. automatically initiating corrective measures to reduce the hydrogen concentration in said exhaust manifold when the conditions producing said first, second and third signals coexist.

2. A method for monitoring the performance of a stack of $H_2$—$O_2$ PEM fuel cells and alerting the stack's operator and/or triggering corrective action when said performance degrades to an unacceptable level, said stack having an exhaust gas manifold communicating with, and receiving cathode exhaust gas from, each of said cells, comprising the steps of:

1. determining the flow rate of said exhaust gas in said manifold;

2. measuring the concentration of hydrogen in said exhaust gas;

3. correcting the hydrogen concentration measured in step 2 to make allowances for hydrogen concentrations in said exhaust gas attributable to variations in said flow rate;

4. from the corrected hydrogen concentration determined in step 3, determining the rate of change in hydrogen concentration in said exhaust gas with respect to time (i.e. $dH_2/dt$);

5. comparing the $dH_2/dt$ determined in step 4 to a first predetermined value which is the maximum acceptable rate of hydrogen increase in said exhaust gas;

6. outputting a first signal from step 5 when $dH_2/dt$ is equal to or exceeds said first predetermined value;

7. comparing the corrected hydrogen concentration from step 3 to a second predetermined value which is the maximum acceptable total hydrogen content in said exhaust gas;

8. outputting a second signal from step 7 when the corrected hydrogen concentration from step 3 is equal to or exceeds said second predetermined value;

9. measuring the total voltage ($V_s$) across said stack;

10. determining the rate of any decrease in stack voltage with respect to time ($dV_s/dt$);

11. reading the power demand on the stack;

12. correcting the rate of stack voltage decrease ($dV_s/dt$) determined in step 10 to make allowances for stack voltage changes attributable to said power demand;

13. comparing the corrected rate of stack voltage decrease from step 12 to a third predetermined value which is the maximum acceptable decrease in corrected stack voltage;

14. outputting a third signal from step 13 when the corrected stack voltage decrease is equal to or greater than said third predetermined value;

15. comparing the corrected hydrogen concentration from step 3 to a fourth predetermined value which is the maximum acceptable hydrogen concentration in said exhaust gas attributable to seepage of hydrogen gas through said membrane;

16. outputting a fourth signal from step 15 when the corrected hydrogen concentration exceeds said fourth predetermined value;

17. outputting a fifth signal from step 7 when the corrected hydrogen concentration from step 3 is less than said second predetermined value;

18. measuring a first individual voltage, $V_1$, of a first of said PEM fuel cells in said stack;

19. memorizing said first individual voltage, $V_1$;

20. measuring a second individual voltage, $V_2$, of a second of said PEM fuel cells in said stack;

21. determining any difference $\Delta V$ between said first individual voltage $V_1$ and said second individual voltage $V_2$;

22. comparing said difference $\Delta V$ from step 21 to a fifth predetermined value which is the maximum acceptable voltage difference between any two individual cells in said stack;

23. repeating steps 18–22 for each individual cell in the stack;

24. outputting a sixth signal from step 23 when the voltage difference $\Delta V$ between any two cells in said stack is less than or equal to said fifth predetermined value;

25. outputting a seventh signal from step 23 when said voltage difference $\Delta V$ is greater than said fifth predetermined value;

26. automatically initiating an alert that undesirable hydrogen leakage into the exhaust gas is evident when the conditions producing the fourth, fifth and seventh signals coexist;

27. automatically initiating an alert that stack performance is degrading when the conditions producing the third, fifth and sixth signals coexist; and 28. automatically initiating corrective measures to reduce the hydrogen concentration in said exhaust manifold when the conditions producing said first, second and third signals coexist.

* * * * *